(12) United States Patent
Deshmukh et al.

(10) Patent No.: US 9,620,147 B2
(45) Date of Patent: Apr. 11, 2017

(54) INTENT DISCOVERY IN AUDIO OR TEXT-BASED CONVERSATION

(71) Applicant: International Business Machines Corporation, Armonk, NY (US)

(72) Inventors: Om D. Deshmukh, New Delhi (IN); Sachindra Joshi, New Delhi (IN); Saket Saurabh, Uttarakhand (IN); Ashish Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 14/612,989

(22) Filed: Feb. 3, 2015

(65) Prior Publication Data

US 2015/0162020 A1   Jun. 11, 2015

Related U.S. Application Data

(62) Division of application No. 13/526,637, filed on Jun. 19, 2012, now Pat. No. 8,983,840.

(51) Int. Cl.
*G10L 21/10* (2013.01)
*G10L 25/48* (2013.01)
(Continued)

(52) U.S. Cl.
CPC ............... *G10L 25/48* (2013.01); *G10L 15/02* (2013.01); *G10L 15/18* (2013.01); *G10L 15/26* (2013.01); *G10L 21/10* (2013.01); *G10L 15/1822* (2013.01)

(58) Field of Classification Search
CPC ..... G10L 15/18; G10L 15/26; G10L 15/1822; G10L 15/265; G10L 21/10; G06F 17/27; G06F 17/2785; G06F 17/279
(Continued)

(56) References Cited

U.S. PATENT DOCUMENTS

| | | |
|---|---|---|
| 6,199,034 B1 | 3/2001 | Wical |
| 6,269,153 B1 * | 7/2001 | Carpenter ............. H04M 1/645 704/9 |

(Continued)

OTHER PUBLICATIONS

Mishne et al., Automatic Analysis of Call Center Conversations, Proceedings CIKM'05 Proceedings of the 14th ACM International Conference on Information and Knowledge Management, Nov. 5, 2005, pp. 1-7.

(Continued)

*Primary Examiner* — Martin Lerner
(74) *Attorney, Agent, or Firm* — Ryan, Mason & Lewis, LLP

(57) ABSTRACT

Methods, systems, and computer program products for identifying one or more utterances that are likely to carry the intent of a speaker are provided herein. A method includes providing a transcript of utterances to a word weight scoring module to perform inverse document frequency based scoring on each word in the transcript, thereby generating a weight for each word; calculating a weight for each utterance in the transcript to generate weighted utterances by summing the weights or each constituent word in each utterance; comparing at least one weighted utterance to pre-existing example utterances carrying the intent of a speaker to determine a relevancy score for the at least one weighted utterance; and generating a ranked order of the at least one weighted utterance from highest to lowest intent relevancy score, wherein the highest intent relevancy score corresponds to the utterance which is most likely to carry intent of the speaker.

20 Claims, 1 Drawing Sheet

(51) Int. Cl.
*G10L 15/18* (2013.01)
*G10L 15/02* (2006.01)
*G10L 15/26* (2006.01)

(58) Field of Classification Search
USPC ....... 704/1, 9, 235, 236, 239, 240, 748, 749;
379/88.01, 88.08, 88.11; 707/748, 749
See application file for complete search history.

(56) References Cited

U.S. PATENT DOCUMENTS

| | | | |
|---|---|---|---|
| 7,197,460 B1* | 3/2007 | Gupta | G10L 15/22 704/251 |
| 7,369,649 B2 | 5/2008 | Zhong | |
| 7,451,089 B1* | 11/2008 | Gupta | G10L 15/22 704/251 |
| 7,647,228 B2 | 1/2010 | Silvera et al. | |
| 8,051,088 B1 | 11/2011 | Tibbetts et al. | |
| 8,300,776 B2* | 10/2012 | Davies | G10L 15/22 379/88.01 |
| 8,515,736 B1 | 8/2013 | Duta | |
| 8,676,565 B2 | 3/2014 | Larcheveque et al. | |
| 8,688,453 B1 | 4/2014 | Joshi et al. | |
| 8,983,840 B2* | 3/2015 | Deshmukh | G10L 15/18 704/235 |
| 2002/0116174 A1* | 8/2002 | Lee | G10L 15/1822 704/9 |
| 2005/0105712 A1* | 5/2005 | Williams | G10L 15/1822 379/265.02 |
| 2005/0141694 A1 | 6/2005 | Wengrovitz | |
| 2007/0055529 A1 | 3/2007 | Kanevsky et al. | |
| 2007/0121860 A1 | 5/2007 | Liang et al. | |
| 2009/0097634 A1 | 4/2009 | Nambiar et al. | |
| 2009/0306981 A1* | 12/2009 | Cromack | G10L 15/26 704/235 |
| 2010/0274618 A1 | 10/2010 | Byrd et al. | |
| 2011/0307435 A1 | 12/2011 | Overell et al. | |
| 2011/0314059 A1* | 12/2011 | Hu | G06F 17/30864 707/771 |
| 2012/0022857 A1 | 1/2012 | Baldwin et al. | |
| 2012/0053945 A1 | 3/2012 | Gupta et al. | |
| 2012/0059713 A1 | 3/2012 | Galas et al. | |
| 2012/0089394 A1 | 4/2012 | Teodosiu et al. | |
| 2012/0179465 A1* | 7/2012 | Cox | G10L 15/26 704/235 |
| 2012/0197905 A1 | 8/2012 | Kumar et al. | |
| 2012/0296638 A1 | 11/2012 | Patwa | |
| 2012/0303637 A1* | 11/2012 | Carmel | G06F 17/241 707/749 |
| 2013/0262114 A1 | 10/2013 | Brockett et al. | |
| 2014/0180692 A1 | 6/2014 | Joshi et al. | |
| 2014/0365209 A1* | 12/2014 | Evermann | G06F 17/279 704/9 |
| 2015/0066479 A1* | 3/2015 | Pasupalak | G06F 17/279 704/9 |
| 2015/0149172 A1* | 5/2015 | Doyle | G10L 15/08 704/235 |
| 2015/0179165 A1* | 6/2015 | Mohamed | G10L 15/08 704/251 |
| 2015/0235654 A1* | 8/2015 | Gibbon | G10L 21/10 704/235 |
| 2016/0203125 A1* | 7/2016 | Sarikaya | G06F 17/279 704/9 |

OTHER PUBLICATIONS

Tf*idf, Wikipedia, http://en.wikipedia.org/wiki/Tf*idf downloaded Jun. 19, 2012, pp. 1-2.

* cited by examiner

INTENT DISCOVERY IN AUDIO OR TEXT-BASED CONVERSATION

CROSS-REFERENCE TO RELATED APPLICATIONS

This application is a divisional of U.S. Pat. No. 8,983,840, issued Mar. 17, 2015, and incorporated by reference herein.

FIELD OF THE INVENTION

Embodiments of the invention generally relate to information technology, and, more particularly, to audio analysis.

BACKGROUND

Challenges exist in ascertaining speaker intent in audio or text-based human dialogue. Existing approaches have largely focused on call segmentation, emotion detection, summarization and other topics. However, a need exists for a technique to automatically detect utterances in a conversation that are likely to carry speaker intent tram an audio or text-based conversation.

SUMMARY

In one aspect of the present invention, techniques for intent discovery in audio or text-based conversation are provided. An exemplary computer-implemented method for identifying one or more utterances that are likely to carry the intent of a speaker, from a conversation between two or more parties, can include steps of providing at least one transcript of utterances from a conversation between two or more parties to a word weight scoring module to perform inverse document frequency based scoring on each word in the at least one transcript, thereby generating a weight for each word, wherein the inverse document frequency based scoring measures the frequency of each word throughout the at least one transcript; calculating a weight for each utterance in the transcript to generate weighted utterances by summing the weights of each constituent word in each utterance; comparing at least one weighted utterance to pre-existing example utterances carrying the intent of a speaker to determine a relevancy score for the at least one weighted utterance based on similarity to the example utterances; and generating a ranked order of the at least one weighted utterance from highest to lowest intent relevancy score, wherein the highest intent relevancy score corresponds to the utterance which is most likely to carry intent of the speaker, and wherein said generating is carried out by a relevant propagation module executing on a hardware processor of the computing device.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps.

Yet another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
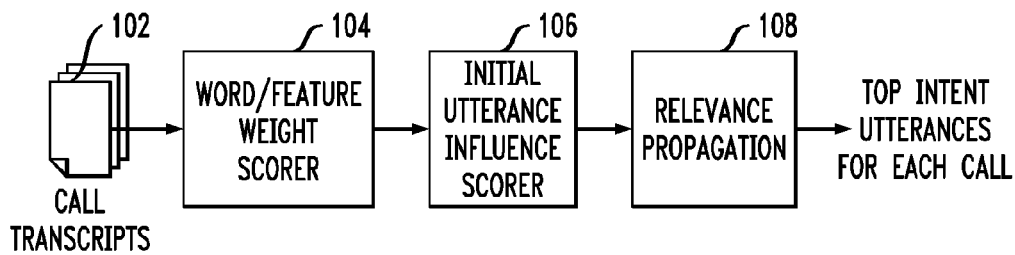
FIG. 1 is a block diagram illustrating an example embodiment, according to an aspect of the invention.

As described herein, an aspect of the present invention includes intent discovery in audio and/or text-based conversations. Given an audio or text-based conversation, for example, between a customer and one or more agents, an aspect of the invention includes determining or extracting the utterances that likely carry intent of the customer.

In an example implementation of at least one embodiment of the invention, intent can be defined as the reason a caller (or customer) contacted a call-center. In such a scenario, a caller/customer may be calling the call-center to convey a message, to get an issue resolved, etc. Also, intent can be multi-level, such as, for instance, in connection with billing versus connection. By way of example, a billing-related call can be directed to a billing, address, a wrong amount billed, a refund adjustment issue, etc.

Accordingly, in such an example implementation, extracting utterances that contain intent from a customer-agent conversation can facilitate identification of top customer issues and assist in efficient aggregation of customer concerns and feedback. Additionally, extracting utterances that are likely to contain intent from a customer-agent conversation can aid a supervisor to efficiently browse through calls to detect salient or determined-relevant conversations for quality monitoring. Also, analysis of correlations of call-center service, level agreements (SLA) and customer issues can be aided with at least one embodiment of the invention. Further, extracting utterances that likely carry intent from a customer-agent conversation can facilitate identification of frequently asked questions (FAQs) and enable call automation. Additionally, as detailed herein, at least one embodiment of the invention can include assisting in sorting and indexing calls, as well as improving call summarization.

Accordingly, an example embodiment of the invention can be carried out as follows. Given a set of utterances and the utterances' chronological or temporal order in a conversation, the utterances are ranked such that the utterance which is most likely to carry the caller intent has the highest rank. In order to obtain the ranked utterances, a score is computed for each utterance that includes two sub-scores. The first sub-score is computed based on the constituent words of the utterance. Each word is assigned a score based on its number of occurrences in the utterance and how often it occurs in general in the corpus. In at least one embodiment of the invention, the utterance score can be the sum of the individual word scores. The second sub-score for the utterance is computed based on the utterance's similarity with the subsequent utterances in the conversation. Similarity measures such as, for example, cosine similarity, can be used for this purpose. The final score for the utterance is computed as a linear combination of the two sub-scores. Accordingly, the utterances are ranked in decreasing order of score.

This aspect of the invention is carried out in similar fashion for both audio conversations and text conversations. Audio conversations are first transcribed either manually or using automatic speech recognition (ASR) techniques, and the utterances that carry intent are identified as described herein.

FIG. 1 is a block diagram illustrating an example embodiment, according to an aspect of the invention. By way of illustration, FIG. 1 depicts conversation or call transcripts 102, which are provided to a word/feature weight scorer module 104. By way of example, this module can perform inverse document frequency (idf) based scoring. The inverse document frequency is a measure of whether a word or term is common or rare across all documents. An idf score is obtained by dividing the total number of documents by the number of documents containing the term, and then taking the logarithm of that quotient as follows:

$$idf(t, D) = \log \frac{|D|}{|\{d \in D : t \in d\}|}.$$

In this equation, $|D|$ is the cardinality of D, or the total number of documents in the corpus, $|\{d \in D : t \in d\}|$ is the number of documents where the term t appears (that is, tf(t, d)≠0). If the term is not in the corpus, this will lead to a division-by-zero. It is therefore common to adjust the formula to $1+|\{d \in D : t \in d\}|$.

Alternatively, the weights for a set, of words can be given manually. That is, a list of words likely indicative of intent, along with weights, can be provided. Here, a weight associated with each word characterizes a probability that this is an intent-carrying word in the given domain.

Once a weight for each word is determined, a weight for each utterance can be calculated. An example method for calculating weight of an utterance is summing the weight of each constituent word in the utterance. Alternatively, the weight of an utterance can be determined by taking the weight of the word with a maximum weight that occurs in the utterance.

As illustrated in FIG. 1, output from weight scorer module 104 is provided to initial utterance influence scorer module 106. By way of example, the initial utterance influence scorer module 106 can perform term frequency-inverse document frequency (tf-idf) based scoring. Alternatively, examples of intent utterances can be provided and an initial score for an utterance can be derived by looking at the similarity between the utterance and the provided intent utterances. Output from the influence scorer module 106 is provided to the relevance propagation module 108, which generates the top likely intent-carrying utterances for each conversation or call.

The relevance propagation module 108 can perform relevance score propagation based on notions such as, for example, that intent is typically conveyed in the early part of a call, and that the intent conveyed drives the entire call.

Further, in at least one embodiment of the invention, the call is represented as a graph, such that nodes correspond to utterances and edge weights correspond to the similarity between the utterances. Additionally, an algorithm used in at least one embodiment of the invention includes initializing a relevance score using tf-idf weights of the constituent words of an utterance. Also, relevance scores can be propagated to the nodes back in time proportional to the weights of the edges, and utterances (nodes) with high relevance scores can be extracted. By way of example, such an algorithm can include the following:

$$final\_rel\_score(i) = ini\_rel\_score(i) + prop\_score(i)$$

$$prop\_score(i) = \sum_{j \neq i} ini\_rel\_score(j) * sim\_wt(i, j)$$

Accordingly, once an initial weight of an utterance is determined, the weights can be propagated in a call in the following manner. Let $u_1$ be the first utterance in the call and $u_2$ be the second utterance in the call. Let $w_1$ be the initial weight associated with $u_1$ and $w_2$ be the initial weight associated with $u_2$. Further, let $sim(u_1, u_2)$ denote a similarity value between the utterance $u_1$ and $u_2$. As noted, an example function such as cosine similarity between the vector representations of the utterances can be used in making this calculation. In the relevance propagation, a weight is propagated from utterance $u_2$ to utterance $u_1$, where $u_2$ occurs chronologically subsequent to $u_1$, in the following way:

$$Prop\_score(u_2, u_1) = w_2 * sim(u_1, u_2).$$

Here, Prop_score($u_2$, $u_1$) denotes the propagated score from $u_2$ to $u_1$. The overall score for an utterance, for example, $u_1$, can be calculated as follows:

Final_score($u_1$)=$w_1$+sum_{all utterances $u_i$ that occur chronologically later than $u_1$*Prop_score ($u_i$, $u_1$)}.

Additionally, an edge weight computation can be carried using, for example, a word match between the utterances, cosine similarity of tf-idf vectors of the utterances, word co-occurrence, etc. Word co-occurrence can include mutual information between words computed based on statistics from the entire set of data, and can potentially link utterances not only containing the same words but also containing semantically-linked words based on the context of the call or conversation. Mutual information between two words can be estimated from the entire set of data, and utterance co-occurrence can be computed from component word co-occurrences.

By way of example, the above computation can be carried out via an equation such as the following:

$$M(word_1, word_2) = \frac{P(word_1, word_2)}{P(word_1) * P(word_2)}$$

As detailed herein, an aspect of the invention includes the use of features between utterances. Features are words that have a causal relation with a higher set of words. For to example, the word "bill" may have a causal relation with "date" and/or "month." As used herein, features are words or bigrams or phrases, and a set of features is computed automatically given a set of conversations. A causal relationship between words, such as described herein, captures, for example, how likely it is that a term "y" will occur given that "x" has already occurred. By way of illustration, if "bill"

has already occurred in a call, it may be likely that the call will include a word such as "credit card," "pay," etc.

As noted, at least one embodiment of the invention includes presenting utterances of an audio and/or text-based conversation in a ranked order such that the rank corresponds to intent-likelihood. Additionally, an aspect of the invention can include highlighting and displaying the utterance(s) and/or region(s) of the conversation that correspond to the intent.

By way merely of illustration, below is an example call center conversation between an operator (agent) and a caller (customer) for which an embodiment of the invention can be implemented. Note that underlined words indicate casual relations, and bold words indicate across-call occurrences.

Operator: Acme Bank, how may I help you?
Caller: Yes, I had a question about my creditcardbill.
Operator: Can I have your name?
Caller: Bob Smith.
Operator: And your credit card account number?
Caller: 1234 5678 9876 5432.
Operator: What is your billing address?
Caller: 742 Evergreen Terrace, Springfield, Oreg.
Operator: Thank you, Mr. Smith. What was the problem with your bill statement?
Caller: I see a charge on December 15 on my card for $25 that I do not understand. I cannot figure out who the payee is for this bill. I only see a hunch of numbers and letters against the charge.
Operator: One moment, please.
Operator: The $25 charge on December 15 was for Company XYZ.
Caller: How am I supposed to determine that from the numbers and letters on the card statement?
Operator: I understand. Do you want to contestthecharge?
Caller: No. That is not necessary. I just needed to know what that bill was for.
Operator: Is there anything else that I can help you with today?
Caller: No. That is all. Thank you
Operator: You're welcome. Thank you for using Acme Bank.

Figure 2:
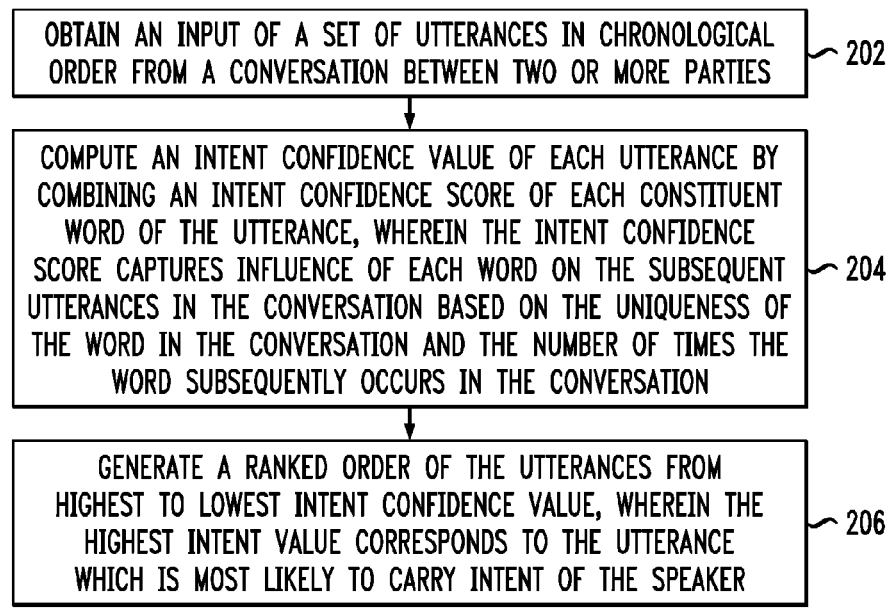
FIG. 2 is a flow diagram illustrating techniques for identifying one or more utterances that are likely to carry the intent of a speaker, from a conversation between two or more parties, according to an embodiment of the invention.

FIG. 2 is a flow diagram illustrating techniques for identifying one or more utterances that are likely to carry the intent of a speaker, from a conversation between two or more parties, according to an embodiment of the present invention. Step 202 includes obtaining an input of a set of utterances in chronological order from a conversation between two or more parties. As detailed herein, the utterances can be transcriptions of original audio utterances and/or text-based utterances.

Step 204 includes computing an intent confidence value of each utterance by combining or summing intent confidence scores from each of the constituent words of the utterance, wherein intent confidence scores capture each word's influence on the subsequent utterances in the conversation based on (i) the uniqueness of the word in the conversation and (ii) the number of times the word subsequently occurs in the conversation.

In at least one embodiment of the invention, influence of each word on the subsequent utterances in the conversation can also be based on similarity of words, phrases and/or features between utterances in the conversation. Similarity of words can be based, for example, on a cosine similarity measure. Features can include words that have a causal relation with a higher set of words.

Step 206 includes generating a ranked order of the utterances from highest to lowest intent confidence value, wherein the highest intent value corresponds to the utterance which is most likely to carry intent of the speaker. Additionally, at least one embodiment of the invention includes selecting the top N utterances from the ranked order to represent an intent summary of the conversation.

Additionally, as detailed herein, at least one embodiment of the invention can include providing at least one transcript of utterances from a conversation between two or more parties to a word weight scoring module to perform inverse document frequency based scoring on each word in the at least one transcript, thereby generating a weight for each word, wherein the inverse document frequency based scoring measures the frequency of each word throughout the at least one transcript, calculating a weight for each utterance in the transcript to generate weighted utterances by summing the weights of each constituent word in each utterance. Such an embodiment can also include comparing at least one weighted utterance to pre-existing example utterances carrying the intent of a speaker to determine a relevancy score for the at least one weighted utterance based on similarity to the example utterances, and generating a ranked order of the at least one weighted utterance from highest to lowest intent relevancy score, wherein the highest intent relevancy score corresponds to the utterance which is most likely to carry intent of the speaker.

A word weight scoring module can include a list of words likely indicative of speaker intent along with a weight associated with each word, wherein the weight characterizes probability that the word is a word carrying intent of a speaker.

Additionally, such an embodiment can further include performing term frequency-inverse document frequency based scoring on the weighted utterances.

At least one embodiment of the invention can also include highlighting and displaying each utterance and/or region of the conversation that correspond to the intent of the conversation.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 3:
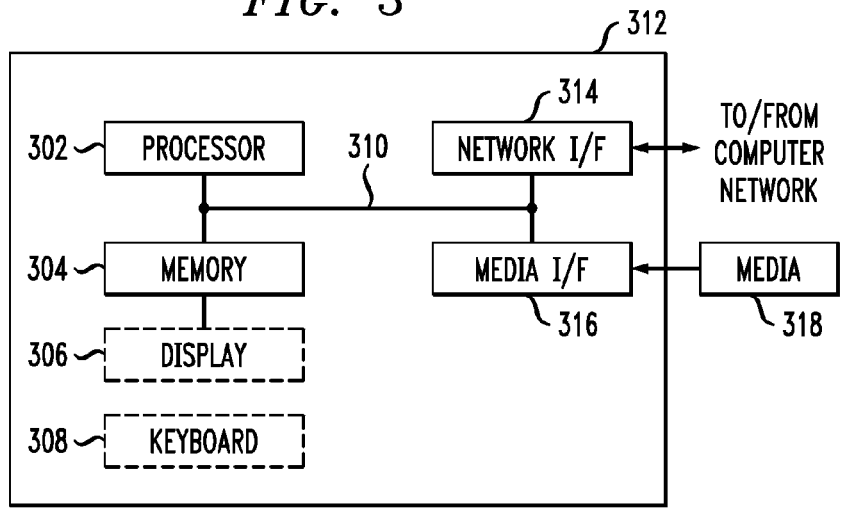
FIG. 3 is a system diagram of an exemplary computer system on which at least one embodiment of the invention can be implemented.

Additionally, an aspect of the present invention can make use of software running on a general purpose computer or workstation. With reference to FIG. 3, such an implementation might employ, for example, to processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing, unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from hulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), as static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the Components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, automatically detecting caller or speaker intent from an audio or text-based conversation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
providing at least one transcript of utterances from a conversation between two or more parties to a word weight scoring module to perform inverse document frequency based scoring on each word in the at least one transcript, thereby generating a weight for each word, wherein the inverse document frequency based scoring measures the frequency of each word throughout the at least one transcript;

calculating a weight for each utterance in the transcript to generate weighted utterances by assigning to each utterance the weight of the word with a maximum weight that occurs in each utterance;

comparing at least one weighted utterance to pre-existing example utterances carrying an intent of a speaker to determine a relevancy score for the at least one weighted utterance based on similarity to the example utterances; and generating a ranked order of the at least one weighted utterance from highest to lowest intent relevancy score, wherein the highest intent relevancy score corresponds to the utterance which is most likely to carry intent of the speaker, and wherein said generating is carried out by a relevant propagation module executing on a hardware processor of a computing device.

2. The method of claim 1, wherein said word weight scoring module includes a list of words likely indicative of speaker intent along with a weight associated with each word, wherein the weight characterizes the probability that the word is a word carrying the intent of the speaker.

3. The method of claim 1, comprising:
performing term frequency-inverse document frequency based scoring on the weighted utterances.

4. The method of claim 1, wherein the utterances are text-based utterances.

5. The method of claim 1, wherein the similarity is based on a cosine similarity measure.

6. The method of claim 1, comprising:
selecting the top N utterances from the ranked order to represent an intent summary of the conversation.

7. The method of claim 1, comprising:
highlighting each utterance and/or region of the conversation that corresponds to the intent of the conversation.

8. The method of claim 7, comprising:
displaying each highlighted utterance and/or region of the conversation that correspond to the intent of the conversation.

9. A computer program product, the computer program product comprising a computer readable storage medium having program instructions embodied therewith, the program instructions executable by a computing device to cause the computing device to:

provide at least one transcript of utterances from a conversation between two or more parties to a word weight scoring module to perform inverse document frequency based scoring on each word in the at least one transcript, thereby generating a weight for each word, wherein the inverse document frequency based scoring measures the frequency of each word throughout the at least one transcript;

calculate a weight for each utterance in the transcript to generate weighted utterances by assigning to each utterance the weight of the word with a maximum weight that occurs in each utterance;

compare at least one weighted utterance to pre-existing example utterances carrying an intent of a speaker to determine a relevancy score for the at least one weighted utterance based on similarity to the example utterances; and generate a ranked order of the at least one weighted utterance from highest to lowest intent relevancy score, wherein the highest intent relevancy score corresponds to the utterance which is most likely to carry intent of the speaker, and wherein said generating is carried out by a relevant propagation module executing on a hardware processor of the computing device.

10. The computer program product of claim 9, wherein said word weight scoring module includes a list of words likely indicative of speaker intent along with a weight associated with each word, wherein the weight characterizes the probability that the word is a word carrying the intent of the speaker.

11. The computer program product of claim 9, wherein the program instructions executable by a computing device further cause the computing device to:
perform term frequency-inverse document frequency based scoring on the weighted utterances.

12. The computer program product of claim 9, wherein the utterances are text-based utterances.

13. The computer program product of claim 9, wherein the similarity is based on a cosine similarity measure.

14. The computer program product of claim 9, wherein the program instructions executable by a computing device further cause the computing device to:
select the top N utterances from the ranked order to represent an intent summary of the conversation.

15. The computer program product of claim 9, wherein the program instructions executable by a computing device further cause the computing device to:
highlight each utterance and/or region of the conversation that corresponds to the intent of the conversation.

16. The computer program product of claim 15, wherein the program instructions executable by a computing device further cause the computing device to:
display each highlighted utterance and/or region of the conversation that correspond to the intent of the conversation.

17. A system comprising:
a memory; and
at least one processor coupled to the memory and configured for:
providing at least one transcript of utterances from a conversation between two or more parties to a word weight scoring module to perform inverse document frequency based scoring on each word in the at least one transcript, thereby generating a weight for each word, wherein the inverse document frequency based scoring measures the frequency of each word throughout the at least one transcript;

calculating a weight for each utterance in the transcript to generate weighted utterances by assigning to each utterance the weight of the word with a maximum weight that occurs in each utterance;

comparing at least one weighted utterance to pre-existing example utterances carrying an intent of a speaker to determine a relevancy score for the at least one weighted utterance based on similarity to the example utterances; and generating a ranked order of the at least one weighted utterance from highest to lowest intent relevancy score, wherein the highest intent relevancy score corresponds to the utterance which is most likely to carry intent of the speaker, and wherein said generating is carried out by a relevant propagation module executing on the at least one processor.

18. The system of claim 17, wherein said word weight scoring module includes a list of words likely indicative of speaker intent along with a weight associated with each word, wherein the weight characterizes the probability that the word is a word carrying the intent of the speaker.

19. The system of claim 17, wherein the at least one processor is configured for:
  performing term frequency-inverse document frequency based scoring on the weighted utterances.

20. The system of claim 17, wherein the at least one processor is configured for:
  highlighting each utterance and/or region of the conversation that corresponds to the intent of the conversation; and
  displaying each highlighted utterance and/or region of the conversation that correspond to the intent of the conversation.

* * * * *